UNITED STATES PATENT OFFICE.

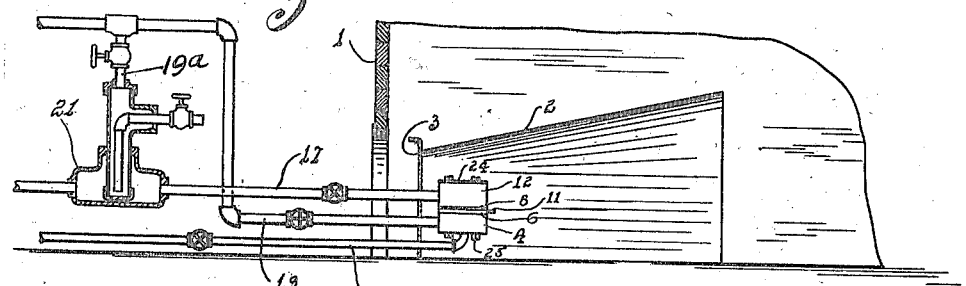

LOUIS J. GOUGUET AND JEAN MONTIS, OF CHICO, CALIFORNIA.

HYDROCARBON-BURNER.

1,158,043.  Specification of Letters Patent.  Patented Oct. 26, 1915.

Application filed March 18, 1915. Serial No. 15,283.

*To all whom it may concern:*

Be it known that we, LOUIS J. GOUGUET, a citizen of the United States, and JEAN MONTIS, a citizen of France, both residing at Chico, in the county of Butte, State of California, have invented certain new and useful Improvements in Hydrocarbon-Burners; and we do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in liquid fuel burners and particularly to that type known as hydro-carbon burners, the object of the invention being to produce a simple and inexpensive burner proper made up of parts easily disassociated and replaced whenever desired, by means of which, when a portion of the burner becomes worn out due to excessive heat, it may be readily replaced without discontinuing the use of the entire structure.

A further object of the invention is to produce a burner in which the fuel will be thoroughly heated prior to delivery to the jet of the burner and which, in its heated state, will be carried off of the burner lip by a steam jet so that it may be highly atomized prior to combustion.

A still further object of the invention is to produce a simple and inexpensive device and yet one which will be exceedingly effective for the purposes for which it is designed.

These objects, we accomplish by means of such structure and relative arrangement of the parts as will fully appear by a perusal of the following specification and claims.

On the drawings, similar characters of reference indicate corresponding parts in the several views.

Figure 1 is a side elevation of the complete structure. Fig. 2 is a rear view of the covering hood of the burner. Fig. 3 is a top plan view of the burner proper, with the cover removed. Fig. 4 is a sectional view of the burner taken on a line X—X of Fig. 3. Fig. 5 is a top plan view of a disk provided with a steam outlet opening.

Referring now more particularly to the characters of reference on the drawings, the numeral 1 designates the fire box.

The numeral 2 designates the hood of the burner for the purpose of controlling the draft, which hood is smallest at its rear end and flares outwardly at its forward end, the rear end being disposed a predetermined distance from the door of the fire box 1 and being provided with a removable door 3 to provide a covered ingress at the rear of the hood. The burner proper consists of a substantially cylindrical member comprising a lower member 4 having a central cupped-out recess 5, there being a disk 6 disposed on the upper edge of the member 4 and having an orifice 7 registering with the recess 5, while resting on the disk 6 is another disk 8 having a central orifice 9 adapted to register with the orifice 7. The latter named disk is of a desired thickness according to different sized burners and is cut away at its forward end, as at 10, such cut away portion being directed toward a projecting fan-shaped lip 11 on the front end of the disk 6. Disposed above the disk 9 is a member 12 having a central recess 13, the forward end of the member 12 having a deep cut out channel 14 having its inner wall 15 tapering from the lower to the upper end and terminating in an opening 16 communicating with the recess 13.

The numeral 17 designates the fuel pipe communicating through a threaded orifice 18 with the recess 13, while the numeral 19 designates the steam pipe communicating through a threaded orifice 20 with a recess 5. The steam pipe 19 is provided with a by-pass 19ª which projects into a heating receptacle 21 arranged in the fuel pipe 17. By means of this structure, the steam may be used when desired for heating the fuel prior to its entry into the recess 13. As will be noted, the fuel fills the recess 13 to the upper edge of the wall 15 and then flows through the opening 16 and down the inclined outer surface of the wall 15 onto the plate 11 where it is picked up by a jet of steam passing through the recess 5 through the opening 10 and is carried off of the fan-shaped plate 11 in a fan-like spray which diverts the fuel to all parts of the fire box for combustion. The disk 8 is made of different thicknesses to control the vertical width of the opening 10 for different sized burners and the length of such opening 10 can be made of desired size to control the size of the spray, the size of the channel 14 being regulated to suit the same.

As will be noted, the fuel is slightly warmed prior to its entrance into the burner where it is further warmed and liquefied by reason of the presence of the zone of steam directly below the same so that by the time it is ready to be atomized by the steam jet, it is in a very high state of liquefaction whereby the most efficient results can be obtained in the combustion of the same.

The member 4 of the device is provided with a bottom threaded outlet 22 with which is connected a blow-off pipe 23 for the purpose of removing the deposits of impurities which may be carried into the receptacle by the steam so that the same will not clog the opening 10. The members 4, 6, 8, 12 and a top cap 24 are all disposed one above the other in the order named and are then secured by bolts 25 extending through the same lengthwise. By means of this structure the entire burner may be disassociated for the purpose of replacing any part which may be broken or burnt out and especially for the purpose of replacing the disk 8 or for cleaning the same when the opening 10 becomes congested. The removable door 3 on the hood 2 is provided with an elongated slot 3ª for the reception of the pipes 17, 19 and 23 and also with an opening 3ᵇ for the purpose of igniting the combustible fuel discharging from the burner and for the purpose of watching the fire.

From the foregoing description it will readily be seen that we have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described our invention, what we claim as new and useful and desire to secure by Letters Patent is:—

1. A burner comprising a lower and an upper member each provided with a recess and an opening communicating with said recess, an orificed disk mounted on said lower member and having a projecting fan-shaped lip, another disk mounted on said first named disk and being cut away adjacent said lip, said upper member having a discharge outlet from the recess therein, such outlet terminating on said lip, as described.

2. A burner comprising a lower and an upper member each provided with a recess and an opening communicating with said recess, two centrally orificed disks interposed between said lower member and said upper member, one of said disks being provided with a lip and the other provided with an opening adjacent said lip, the upper member being provided with an outlet from the recess therein terminating adjacent said lip, and bolts removably connecting all of said members, as described.

In testimony whereof we affix our signatures in presence of two witnesses.

LOUIS J. GOUGUET.
JEAN MONTIS.

Witnesses:
  PERCY S. WEBSTER,
  STEPHEN W. BLEWETT.